US012639583B2

(12) United States Patent
Jiang et al.

(10) Patent No.: US 12,639,583 B2
(45) Date of Patent: May 26, 2026

(54) GENERATING GRADIENT BOOSTING MACHINE MODEL REASON CODES

(71) Applicant: Capital One Financial Corporation, McLean, VA (US)

(72) Inventors: Bingrong Jiang, Phoenix, AZ (US); Taisong Zou, Phoenix, AZ (US)

(73) Assignee: Capital One Finnancial Corporation, McLean, VA (US)

( * ) Notice: Subject to any disclaimer, the term of this patent is extended or adjusted under 35 U.S.C. 154(b) by 993 days.

(21) Appl. No.: 16/238,901

(22) Filed: Jan. 3, 2019

(65) Prior Publication Data

US 2020/0218987 A1     Jul. 9, 2020

(51) Int. Cl.
| | |
|---|---|
| *G06N 5/02* | (2023.01) |
| *G06F 16/22* | (2019.01) |
| *G06Q 40/02* | (2023.01) |

(52) U.S. Cl.
CPC ........... *G06N 5/02* (2013.01); *G06F 16/2246* (2019.01); *G06Q 40/02* (2013.01)

(58) Field of Classification Search
CPC ........ H04N 19/136; G06N 5/02; G06Q 40/02; G06F 16/2246
See application file for complete search history.

(56) References Cited

U.S. PATENT DOCUMENTS

| | | | | |
|---|---|---|---|---|
| 6,158,657 A | * | 12/2000 | Hall, III | ................ G07F 7/1008 |
| | | | | 235/379 |
| 8,410,737 B2 | * | 4/2013 | Wu | ..................... H02P 21/0003 |
| | | | | 318/400.11 |

| | | | | |
|---|---|---|---|---|
| 8,744,941 B2 | * | 6/2014 | Chisholm | .............. G06Q 20/40 |
| | | | | 705/35 |
| 9,117,501 B2 | * | 8/2015 | Takemura | ........ H03K 19/17728 |
| 10,432,942 B2 | * | 10/2019 | Li | ......................... H04N 19/136 |
| 2009/0177612 A1 | * | 7/2009 | Gorham | ................... G06N 7/02 |
| | | | | 706/52 |
| 2011/0078073 A1 | * | 3/2011 | Annappindi | ........... G06Q 40/04 |
| | | | | 705/38 |
| 2012/0066116 A1 | * | 3/2012 | Kornegay | ............ G06Q 20/102 |
| | | | | 705/38 |
| 2014/0067650 A1 | * | 3/2014 | Gardiner | ................ G06Q 40/03 |
| | | | | 705/38 |
| 2017/0076408 A1 | * | 3/2017 | D'Souza | ................ G06Q 20/10 |

(Continued)

FOREIGN PATENT DOCUMENTS

| | | | | |
|---|---|---|---|---|
| JP | | 4183196 B2 * | 12/2008 | ............. G06T 9/007 |

OTHER PUBLICATIONS

Machado, M.R., et al., "LightGBM: an Effective Decision Tree Gradient Boosting Method to Predict Customer Loyality in the Financial Industry", ICCSE 2019 (Aug. 2019), Toronto Canada (Year: 2019).*

(Continued)

*Primary Examiner* — Daniel S Felten
(74) *Attorney, Agent, or Firm* — Lee Sullivan Shea & Smith LLP

(57) ABSTRACT

A method for constructing a lookup table for determining outcomes of a prediction model. The method includes: (a) determining all possible outcomes for each hierarchy of the prediction model; (b) determining contributions of a set of features for each hierarchy of the prediction model; and (c) constructing the lookup table based on all possible outcomes and contributions of each of the set of features.

20 Claims, 10 Drawing Sheets

(56) References Cited

U.S. PATENT DOCUMENTS

| | | | |
|---|---|---|---|
| 2017/0278185 A1* | 9/2017 | Veal, IV | G06Q 40/03 |
| 2017/0286962 A1* | 10/2017 | Lai | G06Q 20/4016 |
| 2018/0225764 A1* | 8/2018 | Donia | G06Q 30/018 |
| 2018/0253793 A1* | 9/2018 | Buckwalter | G06Q 40/03 |
| 2018/0349986 A1* | 12/2018 | Fidanza | G06Q 40/02 |
| 2018/0349991 A1* | 12/2018 | Fidanza | G06Q 20/102 |
| 2019/0073714 A1* | 3/2019 | Fidanza | G06Q 20/342 |
| 2019/0378210 A1* | 12/2019 | Merrill | G06N 5/01 |
| 2022/0122171 A1* | 4/2022 | Hubard | G06Q 40/03 |

OTHER PUBLICATIONS

Chang, Y-C., et al., "Application of extreme boosting trees in the construction of credit risk assessment models for financial institutions" Applied Software Computing Journal, 73 (2018), pp. 914-920 (Year: 2018).*

Maklin, C., "Gradient Boosting Decision Tree Algorithm Explained" Towards Data Science (May 2019) (Year: 2019).*

Natekin, A., and Knoll, A., "Gradient Boosting Machines, a tutorial" (Year: 2019).*

Wikipedia Definition and History of "Look-Up Table", (https://en.wikipedia.org/wiki/Lookup_table). (Year: 2023).*

Google Definition of "Reason Codes" (https://www.google.com/search?q=define+reason+codes . . . ) (Year: 2023).*

Quinlan, J.R., "Induction of Decision Trees," Kluwer Academic Publishers, Boston (Year: 1986).*

Wikipedia, def. "Decision Tree Learning" https://en.wikipedia.org/wiki/Decision_tree_learning (Year: 2024).*

* cited by examiner

300

Build a GBM model based on a set of features
302

Determine all possible outcomes for each hierarchy of the GBM model
304

Determine contributions of each of the set of features for each hierarchy of the GBM model
306

Construct a lookup table based on all possible outcomes and contributions of each feature in the set of features
308

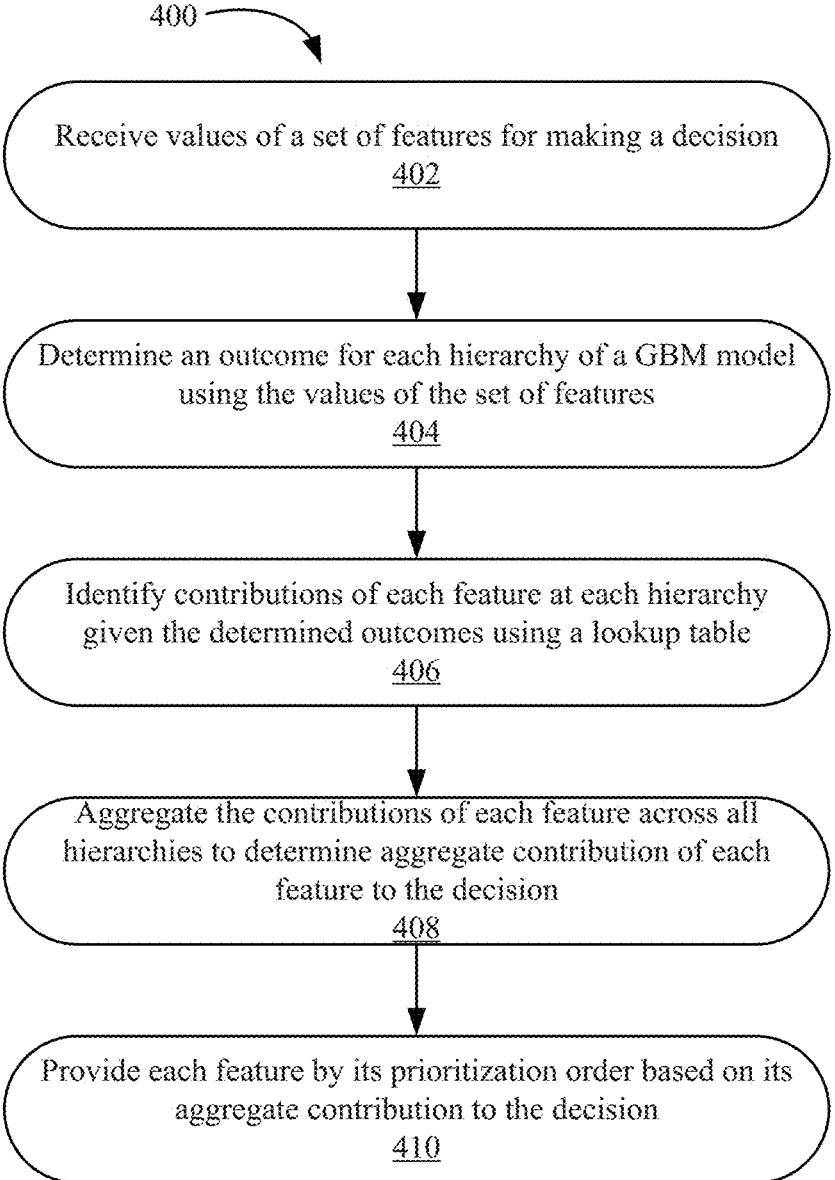

400

Receive values of a set of features for making a decision
402

Determine an outcome for each hierarchy of a GBM model
using the values of the set of features
404

Identify contributions of each feature at each hierarchy
given the determined outcomes using a lookup table
406

Aggregate the contributions of each feature across all
hierarchies to determine aggregate contribution of each
feature to the decision
408

Provide each feature by its prioritization order based on its
aggregate contribution to the decision
410

FIG. 4

| Leaf node | Left | | | Right | | |
|---|---|---|---|---|---|---|
| Direction / Feature | $x_1$ | $x_2$ | $x_3$ | $x_1$ | $x_2$ | $x_3$ |
| Tree 1 Leaf 1 | $w_1(Z_1^1 - Z_1^0)$ | NA | NA | NA | NA | NA |
| Tree 1 Leaf 3 | NA | $w_3(Z_2^1 - Z_2^0)$ | NA | $w_3(Z_1^1 - Z_1^0)$ | NA | NA |
| Tree 1 Leaf 4 | NA | NA | NA | $w_1(Z_1^2 - Z_1^1)$ | NA | 0 |
| Tree 2 Leaf 2 | $w_2(Z_1^3 - Z_1^0)$ | NA | NA | NA | NA | NA |
| Tree 2 Leaf 3 | $w_2(Z_1^1 - Z_1^0)$ | NA | $w_2(Z_3^2 - Z_3^1)$ | NA | NA | $w_2(Z_3^3 - Z_3^2)$ |
| Tree 2 Leaf 4 | NA | NA | NA | $w_2(Z_1^4 - Z_1^2)$ | NA | NA |
| Tree 3 Leaf 1 | NA | NA | $w_3(Z_3^3 - Z_3^0)$ | NA | NA | NA |
| Tree 3 Leaf 3 | NA | NA | NA | $w_3(Z_2^3 - Z_2^0)$ | $w_3(Z_2^3 - Z_2^0)$ | NA |
| Tree 3 Leaf 4 | NA | NA | NA | $w_3(Z_3^4 - Z_3^3)$ | $w_3(Z_2^4 - Z_2^3)$ | $w_3(Z_3^4 - Z_3^3)$ |

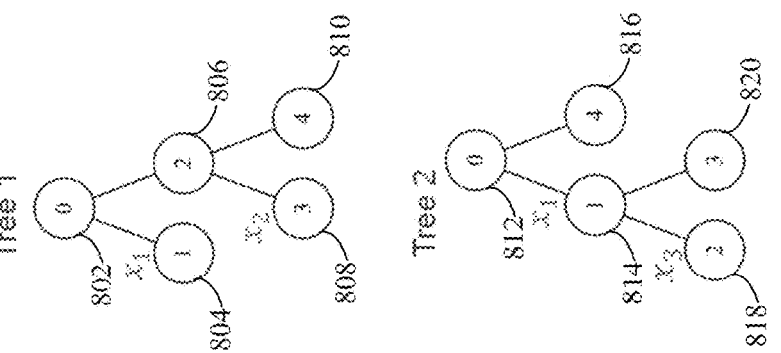

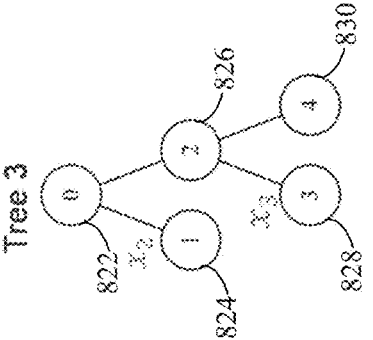

Tree 1

902 — $x_1 > 10$ — 0
904 — 1
906 — 2 — $x_3 > 0.5$
908 — 3
910 — 4

| $x_1$ | $x_2$ | $x_3$ |
|---|---|---|
| 14 | 0.6 | 5 |

Tree 2

912 — $x_1 \leq 15$ — 0
914 — 1 — $x_3 > 4$
916 — 4
918 — 2
920

Tree 3

922 — $x_2 > 0.2$ — 0
924 — 1
926 — 2 — $x_3 > 2$
928 — 3
930

| Leaf node | Left | | | Right | | |
|---|---|---|---|---|---|---|
| (Direction / Feature) | $x_1$ | $x_2$ | $x_3$ | $x_1$ | $x_2$ | $x_3$ |
| Tree 1 Leaf 1 | $w_1(z_1^1 - z_1^0)$ | NA | NA | NA | NA | NA |
| Tree 1 Leaf 3 | NA | $w_1(z_2^3 - z_2^0)$ | NA | $w_1(z_1^3 - z_1^0)$ | NA | NA |
| Tree 1 Leaf 4 | NA | NA | NA | $w_1(z_1^4 - z_1^0)$ | $w_1(z_1^4 - z_1^0)$ | 0 |
| Tree 2 Leaf 2 | $w_2(z_1^2 - z_1^0)$ | NA | $w_2(z_3^2 - z_3^0)$ | NA | NA | NA |
| Tree 2 Leaf 3 | $w_2(z_1^3 - z_1^0)$ | NA | NA | NA | NA | $w_2(z_3^3 - z_3^0)$ |
| Tree 2 Leaf 4 | NA | NA | NA | $w_2(z_1^4 - z_1^0)$ | NA | NA |
| Tree 3 Leaf 1 | NA | $w_3(z_2^1 - z_2^0)$ | NA | NA | NA | NA |
| Tree 3 Leaf 3 | NA | NA | $w_3(z_3^3 - z_3^0)$ | NA | $w_3(z_2^3 - z_2^0)$ | NA |
| Tree 3 Leaf 4 | NA | NA | NA | NA | $w_3(z_2^4 - z_2^0)$ | $w_3(z_3^4 - z_3^0)$ |

Aggregate →

| Total Contribution (Left + Right) | | | Net Contribution (Right − Left) | | |
|---|---|---|---|---|---|
| $x_1$ | $x_2$ | $x_3$ | $x_1$ | $x_2$ | $x_3$ |
| $w_1(z_1^1 - z_1^0) + w_2(z_1^4 - z_1^2)$ | $w_2(z_2^4 - z_2^3) + w_3(z_3^4 - z_3^3)$ | $w_2(z_3^2 - z_3^0) + w_3(z_3^4 - z_3^0)$ | $w_1(z_1^3 - z_1^0) - w_2(z_1^3 - z_1^0)$ | $w_1(z_2^4 - z_2^0) + w_3(z_2^4 - z_2^0)$ | $w_2(z_3^4 - z_3^0) + w_3(z_3^4 - z_3^0)$ |

FIG. 9

GENERATING GRADIENT BOOSTING MACHINE MODEL REASON CODES

BACKGROUND

Financial services companies, such as credit card companies and banks, typically make transaction decisions on whether to approve financial transactions a customer makes at a third party or merchant location. Financial services companies also determine whether to extend certain services to a customer, e.g., whether to increase a credit card limit, whether to approve a request for a new credit card, whether to approve a customer's request for a loan, and so on. These companies consider several factors in determining whether or not to extend services to a customer. For some of these decisions, if the decision is unfavorable (negative or adverse) to customers, the government requires a provision of reasons why the decision is unfavorable. These reasons are called adverse action reasons in the financial industry.

In some cases, the factors being considered are quantified and applied in one or more predictive models to determine whether or not to extend services to a customer. For example, when a customer applies for a new credit card, a financial services company can obtain the customer's credit score, yearly income, outstanding debt, adverse judgements, loan defaults, and so on. The financial services company can then combine these factors to determine whether to approve the customer's application for a new credit card. Sometimes, the models being applied for decision making is complex and determining which factors that mostly contributed to an outcome of the decision is not apparent.

SUMMARY

In an embodiment, the disclosure provides a method for constructing a lookup table for determining outcomes of a tree base machine learning prediction model, including: determining all possible outcomes for each hierarchy of the prediction model; determining contributions of a set of features for each hierarchy of the prediction model; and constructing the lookup table based on all possible outcomes and contributions of each of the set of features.

In another embodiment, the disclosure provides a method for providing a prioritization order of a set of features of a prediction model, including: receiving values of the set of features; determining outcomes for each hierarchy of the prediction model based on the values of the set of features; identifying contributions of each feature at each hierarchy based on a lookup table; aggregating the contributions of each feature across the hierarchies of the prediction model to determine aggregate contribution of each of the set of features; and providing each feature by its prioritization order based on its aggregate contribution.

In yet another embodiment, the disclosure provides a system for providing a prioritization order of a set of features of a prediction model. The system includes a processor and a non-transitory computer readable medium storing processor-executable instructions thereon, such that when the instructions are executed by the processor, the processor facilitates performing: receiving values of the set of features; determining outcomes for each hierarchy of the prediction model based on the values of the set of features; identifying contributions of each feature at each hierarchy based on a lookup table; aggregating the contributions of each feature across the hierarchies of the prediction model to determine aggregate contribution of each of the set of features; and providing each feature by its prioritization order based on its aggregate contribution.

BRIEF DESCRIPTION OF THE DRAWINGS

FIG. 4 is a flow diagram showing steps for providing feature contributions by a server, according to an embodiment of the disclosure;

FIG. 8 shows a lookup table describing feature contributions according to an embodiment of the disclosure; and FIG. 9 shows possible outcomes for a lookup table being aggregated to determine aggregate feature values according to an embodiment of the disclosure.

DETAILED DESCRIPTION

Financial services companies sometimes use a complex model called gradient boosting machine (GBM) model to make decisions on customer behavior to determine whether to extend services to the customer. In the present disclosure, financial services companies are merely used as an example. Institutions, individuals, or any other entities that rely on GBM models to make decisions can benefit from embodiments of the disclosure. In an example, when a financial services company provides a customer with an adverse credit decision, a reason for the adverse decision should be provided to the customer. In a computing environment where models are used, reasons for the decision can be encoded in reason codes, and are provided to the customer in an adverse decision notice. There are several conventional approaches available to rank importance of all factors used in GBM model, but these conventional approaches are impractical for use in real time transactions because they take too much time. In some cases, real time transaction decision should be made within a second, and embodiments of the disclosure provides ways of identifying and ranking factors contributing to the decision within the time limit of real time transactions.

A GBM model is a machine learning algorithm that creates potentially more accurate models than traditional regression type of models, but it can be difficult to interpret GBM models or generate top model features or attributes, i.e., why the model's prediction is high or how much influence does each feature ($x_1$, $x_2$, $x_3$, . . . ) of the model contribute to the outcome (prediction) y of the model. Current methods for determining GBM reason codes are computationally expensive. One current method for determining GBM reason code is to permute the value of a feature and repeat it for all features. Another current method for determining GBM reason code is to build multiple models by dropping one feature at a time.

Embodiments of the disclosure provide systems and methods for interpreting GBM models and generating a ranking of importance of variables of the GBM models. The embodiments generate reason codes for GBM avoiding computationally expensive procedures of current methods. By doing so, reason codes can be generated quickly, thus improving speed and response time of computing servers of financial services companies. The embodiments achieve speed improvements by creating a static lookup table of variable contribution for all possible decision paths in a GBM model based on training data. The lookup table is then referred to when new decisions should be made on one or more customers applying for a service. The lookup table enables quickly determining a ranking of importance of variables of the GBM model.

Figure 1A:
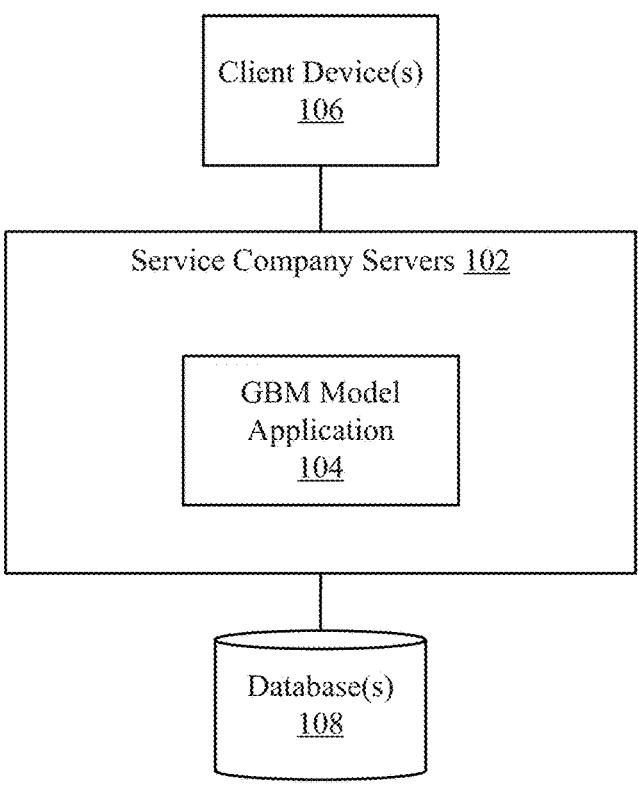
FIG. 1A is a system level diagram illustrating various entities involved in providing services to one or more client devices according to an embodiment of the disclosure.

FIG. 1A illustrates a system for providing services to one or more client devices according to an embodiment of the disclosure. In FIG. 1A, the service company servers 102 can receive service requests from one or more client devices 106. The client devices 106 can include a terminal at a merchant, a terminal with an online merchant or consumers' personal devices such as cell phone and tablet. The service company servers 102 maintain a GBM model application 104. The GBM model application 104 is a software decision engine running on the hardware of the service company servers 102 for implementing a GBM model. The GBM model application 104 provides a production environment for model deployment. Models can be deployed in multiple ways, depending on the underlying platform of the service company servers 102 and how the GBM model will be scored. Examples of production environments/platforms include a system/platform based on Java®, and/or a system/platform based on predictive model markup language (PMML). In some embodiments, the GBM model can be used in an adhoc manner, that is, the GBM model is scored once in a while.

The GBM model application 104 relies on one or more databases 108 for information storage and retrieval. The one or more databases 108 also include data repositories to which the service company servers 102 store data, e.g., a lookup table, used by the GBM model application 104 to make decisions. In some embodiments, the lookup table is stored in memory or hard drive of the service company servers 102. In some embodiments of the disclosure, the lookup table is used by the GBM model application 104 to determine a ranking of importance of variables of the GBM model.

Figure 1B:
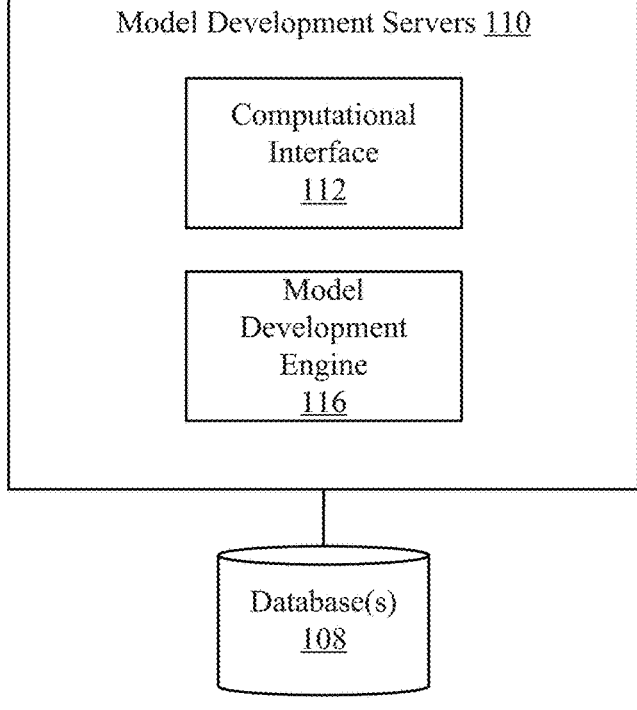
FIG. 1B is a system level diagram illustrating entitles involved in developing a model for decision-making according to an embodiment of the disclosure.

FIG. 1B illustrates a system for developing a model for decision-making according to an embodiment of the disclosure. The system includes model development servers 110 which run a computational interface 112 and a model development engine 116. An example of the computational interface 112 is SAS® Enterprise Miner™. The computational interface 112 is an analytic or programming interface that allows model creators and developers to utilize software/packages to develop the GBM model. The model development engine 116 provides an analytics environment for model development. The model development engine 116 includes software/package with a GBM algorithm that trains the GBM model for model training and validation. In some embodiments, the computational interface 112 can be bundled with the model development engine 116. For example, SAS® Enterprise Miner™ includes the SAS® interface and an algorithm for training a GBM model. In some embodiments, different types of computational interfaces can be paired with different types of GBM model engines. For example, H2O has its own H2O interface, but also allows training a GBM model using a Python or R interface through representational state transfer (REST) application programming interface (API). The model development servers 110 rely on the one or more databases 108 for storing data that is used to train, validate, and/or test the GBM model during model development.

In an embodiment, service company servers 102 include computing servers of a financial services company, and client devices 106 include computing devices of potential customers of the financial services company. A potential customer of the financial services company can use the client device 106 to request, e.g., a new line of credit from the financial services company. In some embodiments, an agent operating the client device 106 makes the request on behalf of the potential customer. The service company servers 102 can then determine whether or not to approve of this line of credit using the GBM model application 104. The GBM model application 104 receives information from one or more databases 108 and from the client device 106 to determine an outcome of whether to approve the line of credit. The outcome is provided to the client device 106, and if an adverse decision is made, one or more reason codes for why the new line of credit was not approved are provided to the client device 106. In an embodiment, the one or more reason codes are sent to a printer device or saved in the database for later preparing in a document to be mailed to the potential customer.

Figure 2:
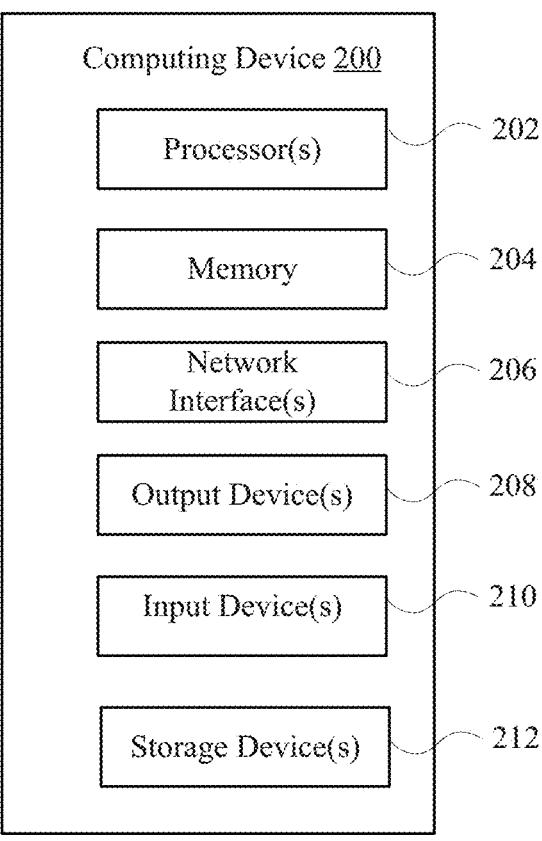
FIG. 2 is a computing device according to an embodiment of the disclosure.

FIG. 2 illustrates hardware components of a computing device 200 according to an embodiment of the disclosure. The computing device 200 may be used as the client devices 106, service company servers 102, the model development servers 110, and the databases 108. Computing device 200 may include one or more processors 202, memory 204, network interfaces 206, output devices 208, input devices 210, and storage devices 212. Each component provided is interconnected physically, communicatively, and/or operatively for inter-component communications in order to realize functionality ascribed to client devices 106 and service company servers 102 provided in FIG. 1. To simplify the discussion, the singular form will be used for all components identified in FIG. 2, when appropriate, but the use of the singular does not limit the discussion to only one of each component. For example, multiple processors may implement functionality attributed to processor 202.

Processor 202 is configured to implement functions and/or process instructions for execution within the computing device 200. For example, processor 202 executes instructions stored in memory 204 or retrieved instructions stored on storage device 212. Memory 204, which may be a non-transitory, computer-readable storage medium, is configured to store information within the computing device 200 during operation. In some embodiments, memory 204 includes a temporary memory that does not retain information stored when the device 200 is turned off. Examples of such temporary memory include volatile memories such as RAM, dynamic random access memories (DRAM), and static random access memories (SRAM).

Storage device 212 includes one or more non-transitory computer-readable storage media. Storage device 212 is provided to store larger amounts of information than memory 204, and in some instances, configured for long-term storage of information. In some embodiments, the storage device 212 includes non-volatile storage elements, e.g., floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The computing device 200 may include multiple network interfaces 206 to facilitate communication via multiple types of networks. Network interfaces 206 may include network interface cards, such as Ethernet cards, optical transceivers, radio frequency transceivers, or any other type of device that can send and receive information. Network interfaces 206 can include Wi-Fi, 3G, 4G, Long-Term Evolution (LTE), Bluetooth®, and other wireless radios.

The computing device 200 may also be equipped with one or more output devices 208 and/or one or more input devices 210. Output device 208 is configured to provide output to a user using tactile, audio, and/or video information. Input device 210 includes devices that provide interaction with the environment through tactile, audio, and/or video feedback. Examples of output device 208 may include a display (liquid crystal display (LCD) display, LCD/light emitting diode (LED) display, organic LED display, etc.), a sound card, a video graphics adapter card, speakers, and so on. Examples of input devices may include a presence-sensitive screen or a touch-sensitive screen, a mouse, a keyboard, a video camera, microphone, and a voice responsive system.

Figure 3:
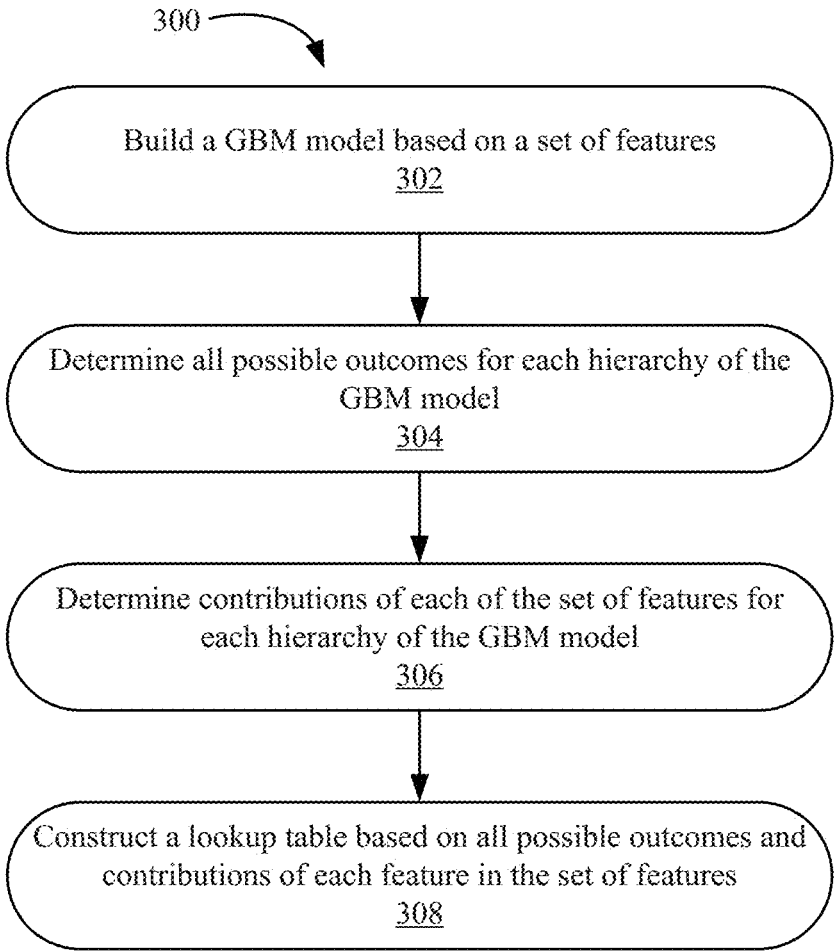
FIG. 3 is a flow diagram showing steps for building a lookup table by a server, according to an embodiment of the disclosure.

FIG. 3 is a flow diagram showing steps for building a lookup table by a server, e.g., the model development servers 102, according to an embodiment of the disclosure. At 302, the server builds a GBM model based on a set of features. The GBM model is built using one or more hierarchy of prediction models, e.g., decision trees. Each decision tree is considered a hierarchical level. Traversing each decision tree from a parent node to a leaf node relies on decisions made regarding the set of features at each parent node. Each hierarchical level is combined with a previous level using weighting parameters. The weighting parameters are optimized using machine learning techniques.

At 304, the server determines all possible outcomes for each hierarchy of the GBM model of FIG. 3. Each decision tree terminates at a leaf node, and as such, each decision tree can be traversed from its parent node to reach every leaf node. The traversed path from parent node to leaf node identifies outcomes of each hierarchy of the GBM model.

At 306, the server determines contributions of each feature in the set of features for each hierarchy of the GBM model. For each outcome identified at 304, feature contributions are determined. That is, a determination is made of how certain feature combinations will lead to a certain outcome.

In some embodiments, feature contributions have a directional characteristic. That is, if a left branch is taken from a parent node to arrive at a child node, then the feature contribution associated with reaching the child node is a left-side contribution. If a right branch is taken from a parent node to arrive at a child node, then the feature contribution associated with reaching the child node is a right-side contribution. Each feature contribution can have a directionality associated with it.

At 308, the server constructs the lookup table based on all possible outcomes and contributions of each feature in the set of features. The lookup table contains contributions of each feature in the set of features for each of the possible outcomes. The lookup table can be arranged in a manner where features are identified as columns and leaf nodes (possible outcomes) as rows. In an embodiment, the lookup table constructed is static and remains unchanged during a scoring or evaluation phase. In some embodiments, the lookup table constructed separates left-side contributions from right-side contributions. In some embodiments, when value of a feature is less than a threshold, a branch is taken to the left child node; otherwise a branch is taken to the right child node. Furthermore, there are embodiments where total and net contributions at each feature can be included in the lookup table. A total contribution at each feature is a sum of both the left-side contribution and the right-side contribution. A net contribution at each feature is a difference between the left-side contribution and the right-side contribution.

FIG. 4 is a flow diagram showing steps for providing feature contributions by a server, e.g., the service company server 102, during a transaction according to an embodiment of the disclosure. At 402, the server receives values of a set of features for making a decision. For example, the service company server 102 can receive, from the client device 106, an application for a credit card that includes customer information such as income and debt. The service company server 102 can also pull from a remote database that contains credit bureau data such as a credit score of the individual identified in the application for the credit card.

At 404, the server determines outcomes for each hierarchy of a GBM model using the values of the set of features. For example, the service company server 102 compiles values for the features and provides them to the GBM model application 104 to determine outcomes for each hierarchy of the GBM model for the compiled values. Each hierarchy will provide one outcome.

At 406, the server identifies contributions of each feature for each outcome using a lookup table, e.g., the lookup table constructed according to the flow diagram of FIG. 3. Once the outcomes for the specific values of the set of features are determined at 404, these outcomes are identified in the lookup table. Feature contributions of each outcome are identified in the lookup table. In some embodiments, the contributions of each feature have a directional characteristic and can be identified as either a left-side contribution or a right-side contribution.

At 408, the server aggregates feature contributions across all hierarchies to determine aggregate contribution of each feature to the decision. From the lookup table, feature contributions for each feature are summed across the determined outcomes to obtain aggregate values for each feature influencing the decision.

In some embodiments, the feature contributions have a directional characteristic that is identified as either a left-side contribution or a right-side contribution. As such, aggregate contribution of each feature can be a total contribution and/or a net contribution. A total contribution of each feature is a sum of both the left-side contribution and the right-side contribution. A net contribution of each feature is a difference between the left-side contribution and the right-side contribution.

At 410, the server provides each feature by its prioritization order based on its aggregate contribution to the decision. For example, features can be prioritized according to sign and magnitude of their aggregate values, with higher magnitude indicating higher priority than lower magnitude. The prioritized feature list can be provided to the client device 106 along with the decision of whether to extend the service requested by the client device 106.

In some embodiments, where the aggregate contribution includes a total contribution, the values of the aggregate contributions of the features are prioritized by either ascending order or descending order. For each feature, total contribution can be either a negative number, a positive number, or zero, and the nature of the GBM model determines whether to prioritize by ascending order or descending order.

For example, when the GBM model is predicting a BAD result, i.e., a high probability output provided by the GBM model indicates a BAD result, then the values of the aggregate contributions of the features are prioritized in descending order. This is because features with highly positive total contribution provide a greater push for the GBM model to output a high probability (BAD result). Features with highly negative total contribution influence provide a greater push in the opposite direction, so they are less likely to be a reason why an adverse code would be generated.

In another example, when the GBM model is predicting a GOOD result, i.e., a high probability output provided by the GBM model indicates a GOOD result, then the values of the aggregate contributions of the features are prioritized in ascending order. This is because features with highly negative total contribution provide a greater push for the GBM model to output a low probability of being GOOD (BAD result). Features with highly positive total contribution provide a greater push in the opposite direction, so they are less likely to be a reason why an adverse code would be generated.

In some embodiments, where the aggregate contribution includes a net contribution, the values of the aggregate contributions of the features are prioritized by either ascending order or descending order as described above. Similar to the total contribution, the net contribution can be either a negative number, a positive number, or zero, and the GBM model determines whether to prioritize the net contributions of the features by ascending order or descending order. Net contribution can replace total contribution in the two examples provided above to determine prioritization.

In some embodiments, where the aggregate contribution includes both a total contribution and a net contribution, the total contribution can be used for developing the prioritized feature list as described above based on the nature of the GBM model. And the net contribution can provide additional insights into the model. For example, the sign of the net contribution can be used to determine the positive or negative relationship between the model output and the features. The net contribution can be combined with prioritization based on the total contribution to draw inferences.

For example, assuming a GBM model that predicts a bad loan, left-side contribution of a FICO score feature is 150 and right-side contribution of the FICO score feature is 50. Then a total contribution of the FICO score feature is calculated to be 200, net contribution of the FICO score feature is calculated to be −100, and the total contribution of the FICO score feature has the largest value compared to other features in the GBM model. So FICO score is selected as a top feature since the outcome of the GBM model is a denial of credit (high probability result). In this example, an interpretation for the FICO score feature can be that the FICO score is a major contributor to the outcome of the GBM model based on the magnitude of the total contribution of the FICO score feature. The FICO score feature being low can be interpreted to cause the denial of credit based on the sign of the net contribution of the FICO score feature being negative. A negative sign of net contribution means the left-side impact dominates right-side impact, and it indicates a negative relationship between the FICO score feature and the GBM model predicting a bad loan.

Generally, as applied in the previous example, if the GBM model predicts a bad loan (a denial), then the total contribution from all features are sorted by descending order, because higher total contribution increases probability of a rejection. Top features selected for an adverse reason code are those with highly positive total contribution. A positive sign of net contribution in this example indicates the value of the feature is positively correlated with the probability of being a bad loan. Otherwise stated, the feature is so "high" that it leads to denial.

In another situation, if the GBM model predicts a good loan (an approval), then the total contribution will be sorted by ascending order because lower total contribution decreases probability of approval, i.e., increases probability of a rejection. Top features selected for an adverse reason code are those with highly negative total contribution. A positive sign of net contribution in this example indicates that the value of the feature is positively correlated with the probability of being a good loan.

Figure 4A:
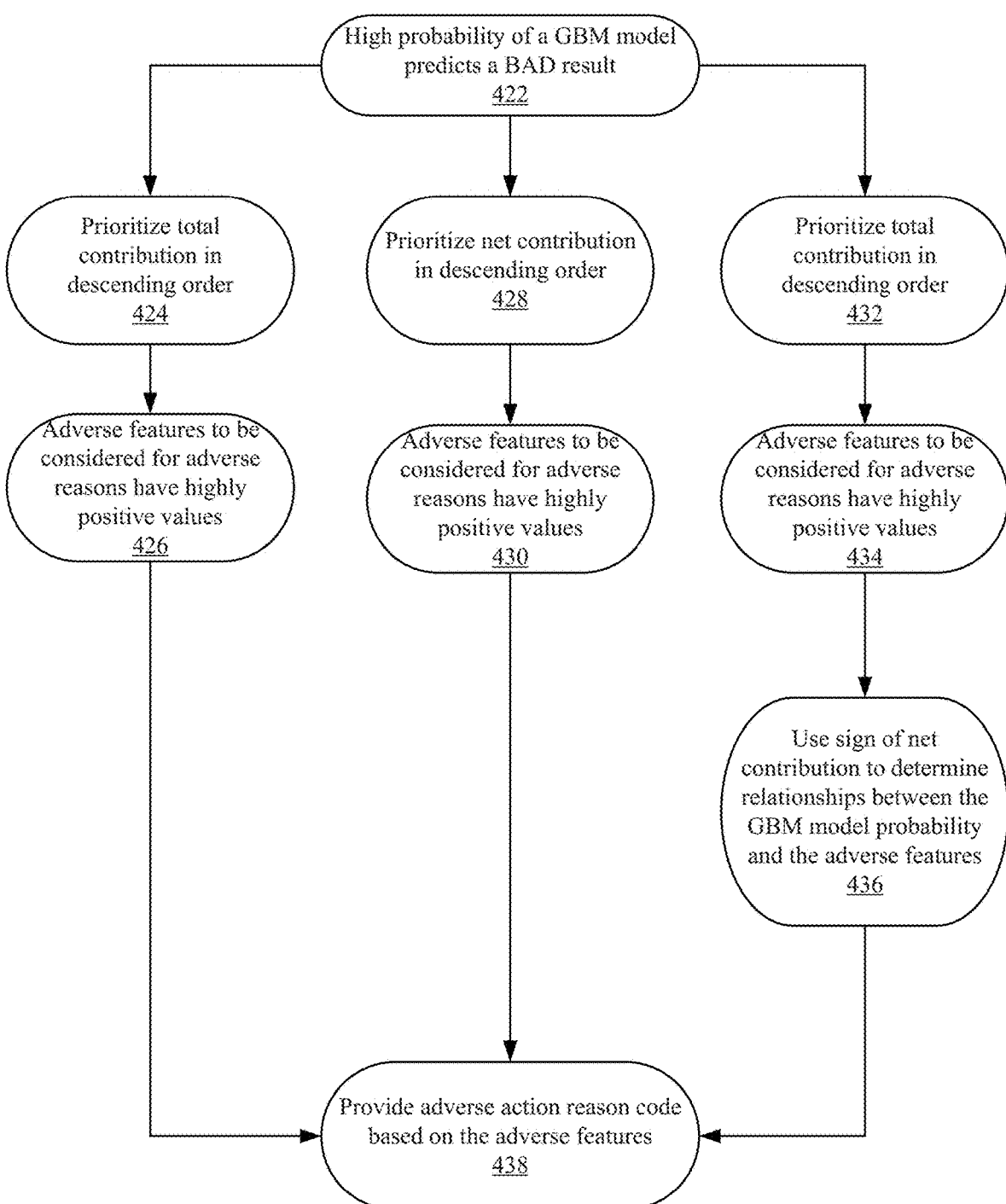
FIG. 4A is a flow diagram for prioritization of feature contributions according to an embodiment of the disclosure.

FIG. 4A provides a summary of the aforementioned example where a high probability of the GBM model predicts a BAD result and how prioritization is performed in this context at 410. At 422, a high probability output from the GBM model indicates a BAD result, thus, since an adverse action reason code is being determined, a high probability output was obtained at 422. There are three paths that can be taken once a high probability output is obtained.

In a first path, at 424, prioritization of total contribution occurs in descending order. Then at 426, adverse features to be considered for adverse reasons have highly positive values of total contribution. A certain number of these adverse features are selected. At 438, the adverse features that make business intuition based on the selection at 426 are provided as adverse action reason codes.

In a second path, at 428, prioritization of net contribution occurs in descending order. Then at 430, adverse features to be considered for adverse reasons have highly positive values of net contribution. A certain number of these adverse features are selected. At 438, the adverse features that make business intuition based on the selection at 430 are provided as adverse action reason codes.

In a third path, at 432, prioritization of total contribution occurs in descending order. Then at 434, adverse features to be considered for adverse reasons have highly positive values of total contribution. At 436, the sign of net contribution is used to determine relationships between the GBM model probability and the adverse features. A negative net contribution sign indicates a negative relationship, and a positive net contribution sign indicates a positive relationship. At 438, the adverse features that make business intuition based on the determined relationships at 436 are provided as adverse action reason codes.

In some embodiments, a suppression logic can be applied to verify that the adverse features selected at any one of 426 and 430 make business intuition. The adverse features that make business intuition based on suppression logic are provided as adverse action reason codes.

In FIG. 4, total and net contributions are two different ways of ranking feature importance. In an embodiment, ranking by total contribution is aligned with importance to the GBM model, and ranking by net contribution is aligned with business intuition. In the examples above, it is seen that the alignment between the model and the outcome or target (predicting a bad outcome vs. predicting a good outcome) impacts how features are ranked. That is, whether ranked in an ascending order or a descending order. In addition, understanding whether a feature should have a positive or negative relationship with the outcome is also important in determining which features are selected as adverse action reason codes.

In some embodiments, the steps in FIG. 4 are performed in parallel to applying feature values obtained at 402 to the GBM model, so that the GBM model provides the decision along with the prioritization order. In some embodiments, a threshold is used to determine whether to view a feature as being significant. For example, a credit card is being sought and an individual has provided debt to income ratio, a credit score, number of cards opened in the past year, debt increase or decrease over the past year, etc. If the aggregate contributions of the credit score and the number of cards opened in the past year are the only two features above the threshold, then these two features are the only two reported to the client device 106. In an embodiment, the feature with the highest aggregate contribution is provided to the client device 106.

Figure 5:
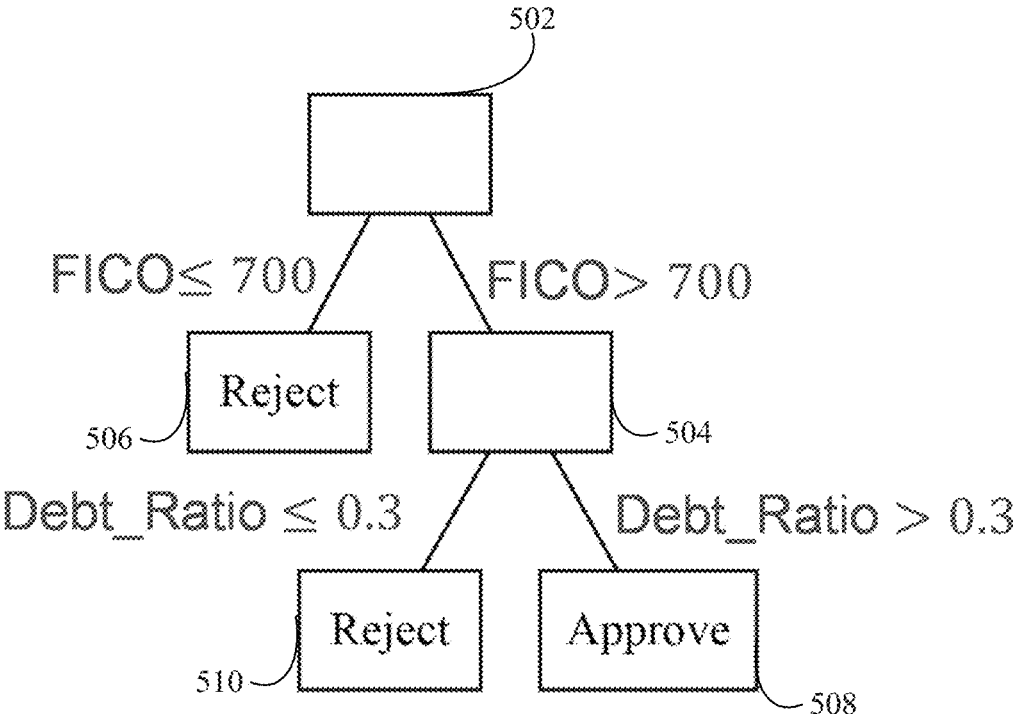
FIG. 5 is a decision tree according to an embodiment of the disclosure.

GBM modeling will be described with respect to an example to further describe embodiments of the disclosure relating to FIGS. 3-4. FIG. 5 is an example of a single decision tree according to an embodiment of the disclosure. Starting from the parent node 502, a FICO score is first checked to determine whether it is less than or equal to 700. If the FICO score is greater than 700, then at node 504, a debt-to-income ratio is checked to determine whether it is less than or equal to 0.3. Leaf nodes of the decision tree in FIG. 5, i.e., nodes 506, 510, and 508, indicate terminal states where a decision is made—the decision being an approval or a rejection. A threshold is used at each parent node and each intermediate node to determine which branch to take. Rule-based prediction can be a powerful tool, exhibiting non-linear characteristics. Decision trees, as shown in FIG. 5, can hierarchically encode one or more rules.

Figure 6:
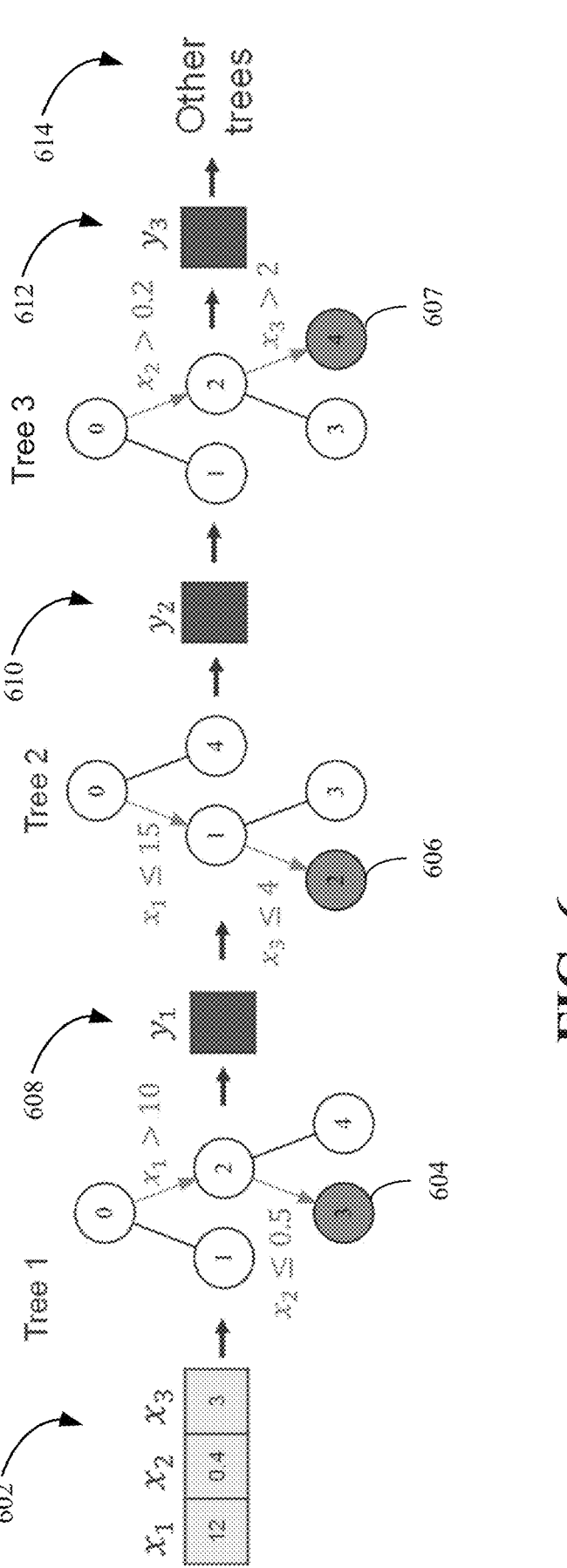
FIG. 6 shows GBM model structure of combining decision trees according to an embodiment of the disclosure.

FIG. 6 shows a combination of multiple decision trees in a hierarchy according to an embodiment of the disclosure. GBM modeling combines multiple decision trees for better decision making or prediction. The GBM model is trained iteratively, constructing trees to focus on errors. Subsequent trees in GBM models are used to predict errors left after previous trees. New instances (or input combinations) visit all trees to get scored. In FIG. 6, values for a set of GBM model features $x_1$, $x_2$, $x_3$ (features 602) are used to first traverse Tree 1, arriving at leaf node 3 (leaf node 604) which produces a result $y_1$ (item 608). Values for $x_1$, $x_2$, $x_3$ (features 602) are then used to traverse Tree 2, arriving at leaf node 2 (leaf node 606), and the result from this traversal is combined with $y_1$ (item 608) to generate $y_2$ (item 610). Afterward, values for $x_1$, $x_2$, $x_3$ (features 602) are then used to traverse Tree 3, arriving at leaf node 4 (leaf node 607), and the result from this traversal is combined with $y_2$ (item 610) to generate $y_3$ (item 612). The process continues for as many decision trees as there are.

Traversals of Tree 1 and Tree 2 are similar to that of FIG. 5. From FIG. 6, features 602, which take on values of $x_1$=12, $x_2$=0.4, and $x_3$=3, are applied to Tree 1 starting from node 0 of Tree 1. At node 0 of Tree 1, feature $x_1$ of the features 602 is determined to be greater than 10, i.e., 12 is greater than 10, so a transition is made from node 0 of Tree 1 to node 2 of Tree 1. At node 2 of Tree 1, feature $x_2$ of the features 602 is determined to be less than or equal to 0.5, i.e., 0.4 is less than or equal to 0.5, so a transition is made from node 2 of Tree 1 to node 3 of Tree 1. Node 3 of Tree 1 is leaf node 604, so for the specific values for $x_1$, $x_2$, $x_3$ (features 602), Tree 1 uses $x_1$ and $x_2$, which are 12 and 0.4, respectively, to arrive at leaf node 604. The result $y_1$ (item 608) encodes implications of the path to leaf node 604.

A similar traversal is performed for Tree 2 where starting from node 0 of Tree 2, feature $x_1$ of the features 602 is determined to be less than or equal to 15, i.e., 12 is less than or equal to 15, which causes a transition to be made from node 0 of Tree 2 to node 1 of Tree 2. At node 1 of Tree 2, feature $x_{a3}$ of the features 602 is determined to be less than or equal to 4, i.e., 3 is less than or equal to 4, so this causes a transition from node 1 of Tree 2 to node 2 of Tree 2. Node 2 of Tree 2 is the leaf node 606. The result $y_2$ (item 610) is a combination of the previous result $y_1$ (item 608) and an encoding of the implications of the path to leaf node 606.

A traversal is performed for Tree 3 where starting from node 0 of Tree 3, feature $x_2$ of features 602 is determined to be greater than 0.2, i.e., 0.4 is greater than 0.2, which causes a transition to be made from node 0 of Tree 3 to node 2 of Tree 3. At node 2 of Tree 3, feature $x_3$ of features 602 is determined to greater than 2, i.e., 3 is greater than 2, so this causes a transition from node 2 of Tree 3 to node 4 of Tree 3. Node 4 of Tree 3 is the leaf node 607. The result $y_3$ (item 612) is a combination of the previous result $y_2$ (item 610) and an encoding of the implications of the path to leaf node 607. If other trees 614 are present in the GBM model, then the previous result $y_3$ (item 612) is combined with an encoding of the implications of the path to leaf nodes of the other trees 612 in a similar manner.

Figure 7:
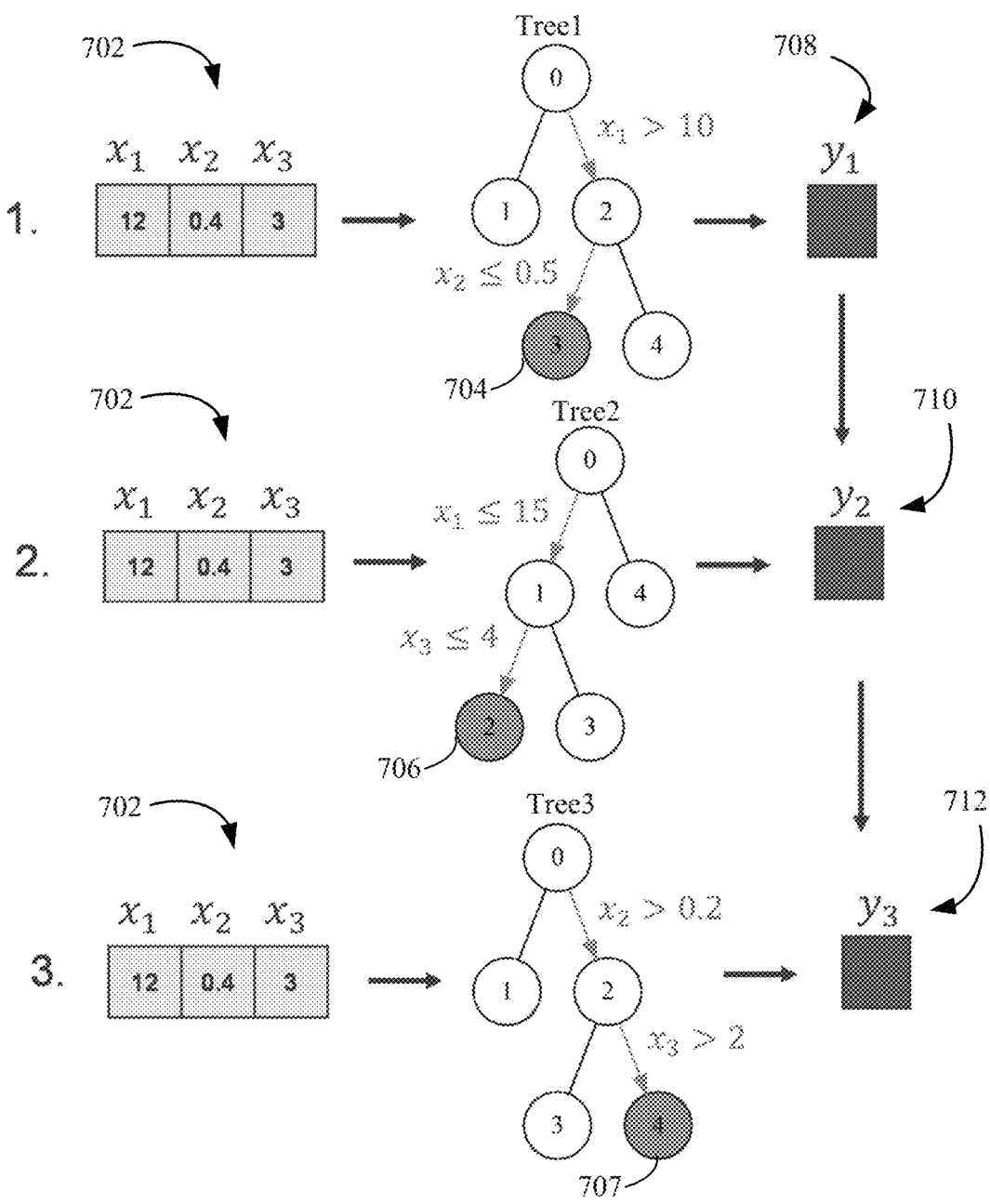
FIG. 7 shows an example of a GBM model with three decision trees according to an embodiment of the disclosure.

FIG. 7 shows an example of combining three decision trees according to an embodiment of the disclosure. The GBM model of FIG. 7 has only three trees, and combining the three trees follows a procedure described above with respect to FIG. 6. That is, result $y_1$ (item 708) is generated using a first decision tree with values for $x_1$, $X_2$, $x_3$ (features 702); result $y_2$ (item 710) is generated using a second decision tree with values for $x_1$, $x_2$, $x_3$ (features 702) and result $y_1$ (item 708); and result $y_3$ (item 712) is generated using a third decision tree with values for $x_1$, $x_2$, $x_3$ (features 702) and result $y_2$ (item 710). In equation form, this can be written for arriving at node 3 of Tree1 (leaf node 704), node 2 of Tree2 (leaf node 706), and node 4 of Tree3 (leaf node 707) as (1), (2) and (3), respectively.

$$f(y_1) = f(\bar{y}) + w_1 Z_1^3 = f(\bar{y}) + w_1\left[\left(Z_1^3 - Z_1^2\right) + \left(Z_1^2 - Z_1^0\right) + Z_1^0\right] \quad (1)$$

$$f(y_2) = f(y_1) + w_2 Z_2^2 = f(y_1) + w_2\left[\left(Z_2^2 - Z_2^1\right) + \left(Z_2^1 - Z_2^0\right) + Z_2^0\right] \quad (2)$$

$$f(y_3) = f(y_2) + w_3 Z_3^4 = f(y_2) + w_3\left[\left(Z_3^4 - Z_3^2\right) + \left(Z_3^2 - Z_3^0\right) + Z_3^0\right] \quad (3)$$

Node value $$Z_i^k$$

is a prediction of node k of tree i. In an embodiment, $f(y)=\log [y/(1-y)]$ is used for classification, and $f(y)=y$ is used for regression. The model used for $f(y)$ is not limited to the aforementioned examples. Node value $$Z_i^k$$

is a function of the prediction in a last iteration of all instances in the node k of tree i. $w_i$ is a learning rate or voting weight of tree i. $\bar{y}$ is the average value of y in the training dataset.

In (1), a two level decision tree (Tree1) is described, where a contribution of the first level is from the feature $x_1$ and is indicated in (1) as $$z_1^2 - z_1^0.$$

and a contribution of the second level is from the feature $x_2$ and is indicated in (1) as $$z_1^3 - z_1^2.$$

In (1), $$z_1^0$$

is the node value at node 0 of Tree1, and since leaf node 704 is reached by values of $x_1$ and $x_2$ in features 702, then contributions of feature $x_1$ and feature $x_2$ are functions of node values for nodes 0, 2 and 3 of Tree1 as previously described. Another observation, the branch direction or direction, can be made here as well. In evaluating from node 0 of Tree1 and arriving at node 3 of Tree1, a right branch was taken at node 0 of Tree1 and then a left branch was taken at node 2 of Tree1. As such, a directional contribution for each feature can be described as well. For example, the contribution of feature $x_1$ at the first level can be described as a right-side contribution. Similarly, the contribution of feature $x_2$ at the second level can be described as a left-side contribution. As such, at leaf node 704, feature $x_1$ provides a right-side contribution of $$z_1^2 - z_1^0,$$

and feature $x_2$ provides a left-side contribution of $$z_1^3 - z_1^2.$$

In (2), a two level decision tree (Tree2) is described as well, where a contribution of the first level is from the feature $x_1$ and is indicated in (2) as $$z_2^1 - z_2^0,$$

and a contribution of the second level is from the feature $x_3$ and is indicated in (2) as $$z_2^2 - z_2^1.$$

In (2), $$z_2^0$$

is the node value at node 0 of Tree2, and since leaf node 706 is reached by values of $x_1$ and $x_3$ in features 702, then contributions of features $x_1$ and features $x_3$ are functions of node values for nodes 0, 1 and 2 of Tree2 as previously described. Since GBM models include multiple decision trees, (2) also includes contributions from $f(y_1)$ which is (1). In Tree2, in order to arrive at leaf node 706, a left branch was taken at node 0 of Tree2 to arrive at node 1 of Tree2, and a left branch was taken at node 1 of Tree2 to arrive at leaf node 706. Therefore, the contribution of feature $x_1$ at the first level and the contribution of feature $x_3$ at the second level can be described as left-side contributions. Thus, feature $x_1$ provides a left-side contribution of $$z_2^1 - z_2^0,$$

and feature $x_3$ provides a left-side contribution of $$z_2^2 - z_2^1.$$

Lastly, in (3), another two level decision tree (Tree3) is described, where a contribution of the first level is from the feature $x_2$ and is indicated in (3) as $$z_3^2 - z_3^0,$$

and a contribution of the second level is from the feature $x_3$ and is indicated in (3) as $$z_3^4 - z_3^2.$$

In $$z_3^0, \tag{3}$$

is the node value at node 0 of Tree3, and since leaf node 707 is reached by values of $x_2$ and $x_3$ in features 702, then contributions of features $x_2$ and features $x_3$ are functions of node values for nodes 0, 2 and 4 of Tree3, as previously described. Similar to the case in Tree2, since GBM models include multiple decision trees, (3) also includes contributions from $f(y_2)$ which is (2). Directional contributions can also be described in this case. To arrive at leaf node 707, two right branches are taken—the first taken at node 0 of Tree3 and the second taken at node 2 of Tree3. Therefore, the contribution of feature $x_2$ at the first level and the contribution of feature $x_3$ at the second level can be described as right-side contributions. Thus, feature $x_2$ provides a right-side contribution of $$z_3^2 - z_3^0,$$

and feature $x_3$ provides a right-side contribution of $$Z_3^4 - Z_3^2.$$

For specific values of 12, 0.4, and 3 for $x_1$, $x_2$, and $x_3$, respectively, applied to the GBM model described in FIG. 7, the possible outcomes are leaf node 704, leaf node 706, and leaf node 707. Using (1), (2), and (3) above, total contribution of each feature in the set of features $x_1$, $x_2$, $x_3$ (features 702) can be determined as (4), (5), and (6) respectively.

$$x_1: w(Z_1^2 - Z_1^0) + w_2(Z_2^1 - Z_2^0) \tag{4}$$

$$x_z: w_1(Z_1^3 - Z_1^2) + w_3(Z_3^2 - Z_3^0) \tag{5}$$

$$X_3: w_2(Z_2^2 - Z_2^1) + w_3(Z_3^4 - Z_3^2) \tag{6}$$

Equations (4), (5), and (6) are determined from substituting (1) into (2), then substituting the result into (3), and identifying contribution of each of $x_1$, $x_2$, $x_3$. Traversal of Tree 1 involved $x_1$ at a first level and $x_2$ at a second level to arrive at leaf node 704, traversal of Tree2 involved $x_1$ at a first level and $x_3$ at a second level to arrive at leaf node 706, and traversal of Tree3 involved $x_2$ at a first level and $x_3$ at a second level to arrive at leaf node 707. Contributions of feature $x_1$ to (3) will therefore include contributions of $x_1$ to Tree1 and Tree2 which evaluate to (4). Since $x_2$ determines outcomes in Tree1 and Tree3 but not Tree2, contributions of $x_2$ to (3) reflect only Tree1 and Tree3 contributions.

Just like how total contribution can be determined, a measure called net contribution can be determined as well. In an embodiment where decision trees have a set convention for directionality, just like the decision trees in FIG. 7, net contribution for each feature can be determined. In FIG. 7, a convention taken is that a decision to take a left branch is a truthful evaluation of a less than or equal to ("≤") relationship, while a decision to take a right branch is a truthful evaluation of a greater than (">") relationship. Taking this convention into account, left-side contributions and right-side contributions for each feature for each decision tree can be determined as previously described. For example, in FIG. 7, for the values of features 702, evaluation of Tree1 results in a right-side contribution for $x_1$ and a left-side contribution for $x_2$. Evaluation of Tree2 results in a left-side contribution for $x_1$ and a left-side contribution for $x_3$. Evaluation of Tree3 results in a right-side contribution for $x_2$ and a right-side contribution for $x_1$.

contributions. In FIG. 7, since the convention is that right branches evaluate greater than relationships and left branches evaluate less than or equal to relationships, subtracting left-side contribution from right-side contribution defines net contribution. This definition of net contribution indicates that net contribution will evaluate to a positive number, a negative number or zero. Therefore, net contribution provides a sign that can be used in providing additional information for interpreting a meaning of total contribution.

FIG. 8 shows a lookup table for describing feature contributions for a GBM model with three trees and three features according to an embodiment of the disclosure. Using the example of FIG. 7, a lookup table is generated for all possible leaf nodes in FIG. 8. The lookup table identifies all possible leaf nodes in its rows and identifies all features in its columns. Other lookup table embodiments can be constructed as well. For example, FIG. 8 illustrates a lookup table separating left-side and right-side contributions of the features $x_1$, $x_2$, and $x_3$. If net contribution is not going to be used, then a lookup table that does not separate these contributions can also be generated. The lookup table in FIG. 8 can be constructed according to the procedure of FIG. 3.

Parent nodes 802 and 806 of Tree 1, parent nodes 812 and 814 of Tree 2, and parent nodes 822 and 826 of Tree 3 are not included in the lookup table of FIG. 8 because they are intermediate nodes. Leaf nodes 804, 808, and 810 of Tree 1, leaf nodes 816, 818, and 820 of Tree 2, and leaf nodes 824, 828, and 830 are included in the lookup table. Following the example of FIG. 7, the first level of Tree 1 is determined by feature $x_1$ and the second level of Tree 1 is determined by feature $x_2$. So reaching leaf node 804 involves an evaluation of the value of $x_1$ at parent node 802 that results in a transition from parent node 802 to leaf node 804. Since leaf node 804 is a leaf node, reaching leaf node 804 only involves contributions of feature $x_1$ and no other features. In the lookup table, contributions of $x_2$ and $x_3$ are both 0 or NA (not applicable) for leaf node 804 (Tree 1, Leaf 1), and contributions for $x_1$ is $$w_i(Z_1^1 - Z_1^0).$$

A similar derivation can be made for the lookup table entry for leaf node 816 which only depends on $x_1$. Depending on the lookup table being constructed, if left-side and right-side

TABLE 1

| | Feature contributions for example illustrated in FIG. 7 | | | |
|---|---|---|---|---|
| Feature | Left-Side Contribution | Right-Side Contribution | Total Contribution (Right + Left) | Net Contribution (Right − Left) |
| $x_1$ | $w_2(Z_2^1 - Z_2^0)$ | $w_1(Z_1^2 - Z_1^0)$ | $w_2(Z_2^1 - Z_2^0) + w_1(Z_1^2 - Z_1^0)$ | $w_1(Z_1^2 - Z_1^0) - w_2(Z_2^1 - Z_2^0)$ |
| $x_2$ | $w_1(Z_1^3 - Z_1^2)$ | $w_3(Z_3^2 - Z_3^0)$ | $w_1(Z_1^3 - Z_1^2) + w_3(Z_3^2 - Z_3^0)$ | $w_3(Z_3^2 - Z_3^0) - w_1(Z_1^3 - Z_1^2)$ |
| $x_3$ | $w_2(Z_2^2 - Z_2^1)$ | $w_3(Z_3^4 - Z_3^2)$ | $w_2(Z_2^2 - Z_2^1) + w_3(Z_3^4 - Z_3^2)$ | $w_3(Z_3^4 - Z_3^2) - w_2(Z_2^2 - Z_2^1)$ |

Each of these contributions is summarized in Table 1. Note that total contribution determined in (4), (5), and (6) is merely a summation of left-side and right-side contributions. The net contribution measure can be determined as a difference between the left-side contributions and the right-side contributions are of interest, then contributions of $x_1$ that result in arriving at leaf node 804 (Tree 1, Leaf 1) is entered under the $x_1$ feature under the left direction column. Similarly, reaching leaf node 816 (Tree 2, Leaf 4) involves branching right from node 812, thus contributions of $x_1$ that result in arriving at leaf node 816 is entered under the $x_1$ feature under the right direction column. Note that a similar derivation can be made for leaf node 824 in Tree 3 which only depends on feature $x_2$.

To reach leaf node 810 (Tree 1, Leaf 4) during traversal, contributions of $x_1$ cause a transition from parent node 802 to parent node 806, and contributions of $x_2$ cause a transition from parent node 806 to leaf node 810. As such, a lookup table entry for leaf node 810 will have no contributions from $x_3$, and contributions for $x_1$ and $x_2$ will be $$w_1(Z_i^2 - Z_1^0)$$

and $$w_1(Z_1^4 - Z_1^2),$$

respectively. If directional columns are accounted for in the lookup table, then contributions for both $x_1$ and $x_2$ will appear under feature contributions pertaining to the right direction column. A similar derivation can be made for the lookup table entries for leaf nodes 808, 818, 820, 828, and 830. Note entries in the lookup table for leaf nodes 808, 820, and 828 will have one directional contribution in the left direction and another in the right direction. Entries in the lookup table for leaf node 818 will have both directional contributions under the left direction, and entries in the lookup table for leaf node 830 will have both directional contributions under the right direction.

Although not shown in FIG. 8, in some embodiments, total contribution and net contribution for each feature can be provided in the lookup table. For example, as previously defined, total contribution is a summation of left-side and right-side contributions, thus a column heading for total contribution can include three sub-columns indicating each feature. And for each row designating a leaf node, contributions of the left and right directions are added to populate the total contribution for each feature. A same derivation can be performed for net contribution. Adding total contribution and net contribution to the lookup table can increase storage requirements for the table if the model has lots of features. Alternatively, total contribution and net contribution can be calculated on the fly without being added to the static lookup table.

FIG. 9 shows possible outcomes for a lookup table being aggregated to determine aggregate feature values according to an embodiment of the disclosure. In FIG. 9, input combination 14, 0.6, and 5 for $x_1$, $x_2$, $x_3$ (features 901), respectively, identifies leaf node 910, leaf node 920, and leaf node 930 as the leaf nodes of interest in the decision trees of the GBM model. Based on these leaf nodes, the possible outcomes are identified in the truth table. Parent nodes 902 and 906 of Tree 1, parent nodes 912 and 914 of Tree 2, and parent nodes 922 and 926 of Tree 3 are not included in the lookup table. Leaf nodes 904, 908, and 910 of Tree 1, leaf nodes 916, 918, and 920 of Tree 2, and leaf nodes 924, 928, and 930 are included in the lookup table. Once the outcomes are identified as leaf nodes 910 920, and 930, the feature contributions to the outcomes are aggregated to determine aggregate values of each feature as described at 408.

FIG. 9 shows the aggregate values of contributions of each of $x_1$, $x_2$, $x_3$ in a table. Aggregate values of contributions of each feature can be total contribution of each feature and/or net contribution of each feature. In determining total contribution, the columns of the lookup table identifying contributions from a single feature are aggregated for the determined outcomes or leaf nodes. For the GBM model including Tree1, Tree2, and Tree3, the total contribution from $x_1$ is $$w_1(Z_1^2 - Z_1^0) + w_2(Z_2^1 - Z_2^0),$$

which corresponds to the left-side contribution of $x_1$ added to the right-side contribution of $x_1$ for the selected leaf nodes. The total contribution from $x_2$ is $$w_1(Z_i^4 - Z_1^2) + w_3(Z_3^2 - Z_3^0),$$

which corresponds to the left-side contribution of $x_2$ added to the right-side contribution of $x_2$ for the selected leaf nodes. The total contribution from $x_3$ is $$w_2(Z_2^3 - Z_2^1) + w_3(Z_3^4 - Z_3^2).$$

As with total contribution, net contribution from each feature can also be determined from the lookup table. Net contribution, as defined in FIG. 9 based on the convention adopted for constructing Tree 1, Tree 2, and Tree 3 in FIG. 9, is defined as left-side contribution subtracted from right-side contribution. Thus, net contribution for each of $x_1$, $x_2$, and $x_3$ is provided as (7), (8), and (9), respectively.

$$x_i\colon w_1(Z_1^2 - Z_1^0) - w_2(Z_2^1 - Z_2^0) \tag{7}$$

$$x_2\colon w_1(Z_1^4 - Z_1^2) + w_3(Z_3^2 - Z_3^0) \tag{8}$$

$$x_3\colon w_2(Z_2^3 - Z_2^1) + w_3(Z_3^4 - Z_3^2) \tag{9}$$

Embodiments of the disclosure can be applied to determine adverse action reason codes. An adverse action reason code usually states how a certain feature impacts the outcome of a decision. For example, if "ratio of balance to credit line on your account too high" is identified as one of the top features impacting the GBM model outcome, then an adverse action communication will state "ratio of balance to credit line on your account too high" as one of the reason codes. In this example, "too high" is communicated by the sign of the factor, i.e., "ratio of balance to credit line" is positively related with model outcome. Other features could be negatively related with the GBM model outcome. The knowledge of how a particular feature is related to a model outcome is obtained from business intuition coupled with empirical analysis. For example, a FICO score is negatively related to a credit risk model, therefore, the higher the FICO score, then the lower the credit risk; and delinquency is positively correlated to credit risk, thus delinquency increases the credit risk.

Based on the convention provided above, the left-side contribution and right-side contribution track the contribution of features or factors when the decision path passes the left children and right children, respectively. The left-side contribution captures contribution of a feature when it is lower than certain cutoffs, while the right-side contribution captures contribution of a factor when it is higher than certain cutoffs. The two directional contributions are obtained in each step and aggregated across all the trees in the model. Afterwards, two matrices are calculated: (a) a total contribution matrix which is determined as a summation of left-side and right-side contributions for each feature; and (b) a sign of net contribution, where net contribution is determined as a difference between the left-side and right-side contributions. The total contribution indicates overall contribution of a feature to the outcome. The sign of net contribution also indicates the sign of a feature that is related with the outcome. In an embodiment, if the sign of net contribution is positive (right-side contribution–left-side contribution), then an adverse action is due to high value of the feature, and vice versa.

In an embodiment, the total contribution and the sign of net contribution can be used together to determine the reason code. Firstly, the total contribution for each feature can be ranked in descending order to identify highly positive features that affect the outcome. Secondly, the sign of the net contribution can be used as the sign of how the feature affects the outcome, that is, whether the outcome is due to a high value of the feature or due to a low value of the feature. In addition to the two matrices obtained above, business knowledge can be used to augment the process of generating an adverse action notice, such as handling missing or other invalid feature values and suppressing a calculated sign that contradicts empirical understanding.

Embodiments of the disclosure enable importance ranking of variables of GBM models in real production environments where transactions should be completed in a few milliseconds. The importance ranking enables generation of reason codes when an adverse action is determined. Reason codes may be required to provide feedback in certain credit granting decisions. Prior approaches to reason code generation required scoring the GBM model multiple times at the time of transaction, rendering them infeasible for providing the ranking in a few milliseconds. As such, embodiments of the disclosure provide speed and performance improvements to computer devices and/or servers tasked with scoring GBM models and providing feature contributions of the score of the GBM model.

GBM models can bring significant improvement in predicting credit worthiness of both applicants and customers over traditional logistic regression models. GBM models can help identify low risk customers, and embodiments of the disclosure can provide insight into why a certain customer is considered low risk based on the ranking of variables of the GBM models.

Embodiments of the disclosure provide a regression method where model coefficients indicate direction or sign of a feature. Compared to conventional methods, tracking direction or sign of a feature can be complicated for a methodology using decision trees. Since multiple trees can be involved in the model, and the direction or sign of the same feature may have different directions or signs in different trees. To identify signs of factor within trees, embodiments of the disclosure track direction at each branch along a traversed path in the decision tree and identify feature contributions in two directional contributions: a left-side contribution and a right-side contribution. A convention can be adopted as described above to minimize memory requirements for tracking the directional contributions. In the examples provided above, a convention is adopted for developing decision trees. In the convention, a left child corresponds to a less than or equal to relationship and a right child corresponds to a greater than relationship.

Other relationships can also be adopted, for example, a left child can correspond to a greater than relationship, and a right child can correspond to a less than or equal to relationship; a left child can correspond to a less than relationship, and a right child can correspond to a greater than or equal to relationship, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method carried out by one or more computing servers associated with a financial services company, the method comprising:

applying, by the one or more computing servers, a machine learning process to training data and thereby training a gradient boosting machine (GBM) model that is configured to (i) evaluate data for a set of features that is related to extending a financial service to an individual and (ii) based on the evaluation, output a prediction related to extending the financial service to the individual, wherein the trained GBM model comprises a combination of decision trees that each have a respective set of leaf nodes representing a respective set of available tree-specific outcomes for the decision tree;

evaluating, by the one or more computing servers, each respective decision tree in the GBM model's combination of decision trees by:

traversing the respective decision tree from its parent node to each leaf node in its respective set of leaf nodes and thereby identifying the respective set of available tree- specific outcomes for the respective decision tree; and for each available tree-specific outcome in the respective decision tree's set of available tree-specific outcomes, evaluating how the GBM model's set of features contributes to the outcome and thereby determining an outcome-specific subset of feature contribution data corresponding to each available tree-specific outcome in the respective set of available tree-specific outcomes for the respective decision tree;

constructing, by the one or more computing servers, a lookup table based on the respective set of available tree-specific outcomes and the corresponding outcome-specific subsets of feature contribution data that are determined for each respective decision tree in the GBM model's combination of decision trees, wherein the lookup table comprises (i) a first dimension corresponding to the available tree-specific outcomes of the GBM model and (ii) a second dimension corresponding to the GBM model's set of features;

after training the GBM model and constructing the lookup table:

executing, by the one or more computing servers, the GBM model by inputting, into the GBM model, a given feature dataset for the set of features that is related to extending the financial service to a given individual, wherein the executed GBM model functions to (i) receive the given feature dataset as input, (ii) evaluate the given feature dataset using the GBM model's combination of decision trees and thereby determine a given set of tree-specific outcomes, and (iii) based on the given set of tree-specific outcomes determined by the GBM model's combination of decision trees, output a given prediction related to extending the financial service to the given individual;

based on the given prediction related to extending the financial service to the given individual that is output by the executed GBM model, making a decision, by the one or more computing servers, of whether to extend the financial service to the given individual; and after making the decision of whether to extend the financial service to the given individual:

determining, by the one or more computing servers, one or more reasons for the decision without re-executing the GBM model by: (i) looking up, in the lookup table, the given set of tree-specific outcomes that were determined by the GBM model's combination of decision trees during execution, (ii) retrieving, from the lookup table, the outcome-specific subsets of feature contribution data corresponding to the looked-up tree-specific outcomes in the given set, (iii) aggregating the retrieved, outcome-specific subsets of feature contribution data corresponding to the looked-up tree-specific outcomes into an aggregated set of feature contribution data that indicates respective contributions of the GBM model's set of features to the given prediction output by the GBM model during execution, (iv) based on the aggregated set of feature contribution data, identifying one or more features that influenced the given prediction output by the executed GBM model, and (v) identifying one or more reason codes that correspond to the identified one or more features, wherein the identified one or more reason codes indicate the one or more reasons for the decision; and outputting, by the one or more computing servers, an indication of (i) the decision of whether to extend the financial service to the given individual and (ii) the one or more reasons for the decision.

2. The method of claim 1, wherein the first dimension of the lookup table comprises the rows of the lookup table and the second dimension of the lookup table comprises the columns of the lookup table.

3. The method of claim 1, wherein, for each available tree-specific outcome in the respective set of available tree-specific outcomes for each respective decision tree, determining the outcome-specific subset of feature contribution data comprises:

determining node values of the respective decision tree corresponding to the available tree-specific outcome; and based on the node values, determining at least one respective contribution value for each of at least a subset of the set of features.

4. The method of claim 1, wherein the lookup table is static.

5. The method of claim 1, wherein the aggregated set of feature contribution data comprises, for each respective feature in the set of features, one or both of (i) a respective total contribution value for the respective feature in the set of features or (ii) a respective net contribution value for the respective feature in the set of features.

6. A computing system associated with a financial services company, the computing system comprising:

a processor; and a non-transitory computer readable medium storing processor-executable instructions thereon that, when executed by the processor, cause the computing system to perform functions comprising:

applying a machine learning process to training data and thereby training a gradient boosting machine (GBM) model that is configured to (i) evaluate data for a set of features that is related to extending a financial service to an individual and (ii) based on the evaluation, output a prediction related to extending the financial service to the individual, wherein the trained GBM model comprises a combination of decision trees that each have a respective set of leaf nodes representing a respective set of available tree-specific outcomes for the decision tree;

evaluating each respective decision tree in the GBM model's combination of decision trees by:

traversing the respective decision tree from its parent node to each leaf node in its respective set of leaf nodes and thereby identifying the respective set of available tree-specific outcomes for the respective decision tree; and for each available tree-specific outcome in the respective decision tree's set of available tree-specific outcomes, evaluating how the GBM model's set of features contributes to the outcome and thereby determining an outcome-specific subset of feature contribution data corresponding to each available tree-specific outcome in the respective set of available outcomes for the respective decision tree;

constructing a lookup table based on the respective set of available tree-specific outcomes and the corresponding outcome-specific subsets of feature contribution data that are determined for each respective decision tree in the GBM model's combination of decision trees, wherein the lookup table comprises (i) a first dimension corresponding to the available tree-specific outcomes of the GBM model and (ii) a second dimension corresponding to the GBM model's set of features; and after training the GBM model and constructing the lookup table:

executing the GBM model by inputting, into the GBM model, a given feature dataset for the set of features that is related to extending the financial service to a given individual, wherein the executed GBM model functions to (i) receive the given feature dataset as input, (ii) evaluate the given feature dataset using the GBM model's combination of decision trees and thereby determine a given set of tree-specific outcomes, and (iii) based on the given set of tree-specific outcomes determined by the GBM model's combination of decision trees, output a given prediction related to extending the financial service to the given individual;

based on the given prediction related to extending the financial service to the given individual that is output by the executed GBM model, making a decision of whether to extend the financial service to the given individual; and after making the decision of whether to extend the financial service to the given individual:

determining one or more reasons for the decision without re-executing the GBM model by: (i) looking up, in the lookup table, the given set of tree-specific outcomes that were determined by the GBM model's combination of decision trees during execution, (ii) retrieving, from the lookup table, the outcome-specific subsets of feature contribution data corresponding to the looked-up tree-specific outcomes in the given set, (iii) aggregating the retrieved, outcome-specific subsets of feature contribution data corresponding to the looked-up tree-specific outcomes into an aggregated set of feature contribution data that indicates respective contributions of the GBM model's set of features to the given prediction output by the GBM model during execution, (iv) based on the aggregated set of feature contribution data, identifying one or more features that influenced the given prediction output by the executed GBM model, and (v) identifying one or more reason codes that correspond to the identified one or more features, wherein the identified one or more reason codes indicate the one or more reasons for the decision; and outputting an indication of (i) the decision of whether to extend the financial service to the given individual and (ii) the one or more reasons for the decision.

7. The computing system of claim 6, wherein the first dimension of the lookup table comprises the rows of the lookup table and the second dimension of the lookup table comprises the columns of the lookup table.

8. The computing system of claim 6, wherein the lookup table is static.

9. The computing system of claim 6, wherein the aggregated set of feature contribution data comprises, for each respective feature in the set of features, one or both of (i) a respective total contribution value for the respective feature in the set of features or (ii) a respective net contribution value for the respective feature in the set of features.

10. The method of claim 1, wherein, for each available tree-specific outcome in the respective set of available tree-specific outcomes for each respective decision tree, the corresponding outcome-specific subset of feature contribution data comprises at least one respective contribution value for each of at least a subset of the set of features.

11. The method of claim 10, wherein, for each available tree-specific outcome in the respective set of available tree-specific outcomes for each respective decision tree, the at least one respective contribution value for each of at least the subset of the set of features comprises a respective total contribution value for each of at least the subset of the set of features.

12. The method of claim 10, wherein, for each available tree- specific outcome in the respective set of available tree-specific outcomes for each respective decision tree, the at least one respective contribution value for each of at least the subset of the set of features comprises a first contribution value associated with a first directionality and a second contribution value associated with a second directionality for each of at least the subset of the set of features.

13. The method of claim 1, wherein the aggregate set of feature contribution data comprises, for each respective feature in the set of features, a respective contribution value of a first type for the respective feature in the set of features, and wherein identifying the one or more features that influenced the given prediction output by the executed GBM model comprises:

identifying any feature in the set of features having a respective contribution value of the first type that is above a threshold value.

14. The method of claim 1, wherein the aggregate set of feature contribution data comprises, for each respective feature in the set of features, a respective contribution value of a first type for each feature in the set of features, and wherein identifying the one or more features that influenced the given prediction output by the executed GBM model comprises:

based on the respective contribution values of the first type for the set of features, ranking the set of features; and identifying a given number of features at a top of the ranked set of features.

15. The computing system of claim 6, wherein, for each available tree-specific outcome in the respective set of available tree-specific outcomes for each respective decision tree, the corresponding outcome-specific subset of feature contribution data comprises at least one respective contribution value for each of at least a subset of the set of features.

16. The computing system of claim 15, wherein, for each available tree-specific outcome in the respective set of available tree-specific outcomes for each respective decision tree, the at least one respective contribution value for each of at least the subset of the set of features comprises a respective total contribution value for each of at least the subset of the set of features.

17. The computing system of claim 15, wherein, for each available tree-specific outcome in the respective set of available tree-specific outcomes for each respective decision tree, the at least one respective contribution value for each of at least the subset of the set of features comprises a first contribution value associated with a first directionality and a second contribution value associated with a second directionality for each of at least the subset of the set of features.

18. A non-transitory computer-readable medium, wherein the non-transitory computer-readable medium is provisioned with program instructions that, when executed by at least one processor, cause a computing system associated with a financial services company to:

apply a machine learning process to training data and thereby train a gradient boosting machine (GBM) model that is configured to (i) evaluate data for a set of features that is related to extending a financial service to an individual and (ii) based on the evaluation, output a prediction related to extending the financial service to the individual, wherein the trained GBM model comprises a combination of decision trees that each have a respective set of leaf nodes representing a respective set of available tree-specific outcomes for the decision tree;

evaluate each respective decision tree in the GBM model's combination of decision trees by:

traversing the respective decision tree from its parent node to each leaf node in its respective set of leaf nodes and thereby identifying the respective set of available tree- specific outcomes for the respective decision tree; and for each available tree-specific outcome in the respective decision tree's set of available tree-specific outcomes, evaluating how the GBM model's set of features contributes to the outcome and thereby determining an outcome-specific subset of feature contribution data corresponding to each available tree-specific outcome in the respective set of available tree-specific outcomes for the respective decision tree;

construct a lookup table based on the respective set of available tree-specific outcomes and the corresponding outcome-specific subsets of feature contribution data that are determined for each respective decision tree in the GBM model's combination of decision trees, wherein the lookup table comprises (i) a first dimension corresponding to the available tree-specific outcomes of the GBM model and (ii) a second dimension corresponding to the GBM model's set of features; and after training the GBM model and constructing the lookup table:

execute the GBM model by inputting, into the GBM model, a given feature dataset for the set of features that is related to extending the financial service to a given individual, wherein the executed GBM model functions to (i) receive the given feature dataset as input, (ii) evaluate the given feature dataset using the GBM model's combination of decision trees and thereby determine a given set of tree-specific outcomes, and (iii) based on the given set of tree-specific outcomes determined by the GBM model's combination of decision trees, output a given prediction related to extending the financial service to the given individual;

based on the given prediction related to extending the financial service to the given individual that is output by the executed GBM model, making a decision of whether to extend the financial service to the given individual; and after making the decision of whether to extend the financial service to the given individual:

determine one or more reasons for the decision without re-executing the GBM model by: (i) looking up, in the lookup table, the given set of tree-specific outcomes that were determined by the GBM model's combination of decision trees during execution, (ii) retrieving, from the lookup table, the outcome-specific subsets of feature contribution data corresponding to the looked-up tree-specific outcomes in the given set, (iii) aggregating the retrieved, outcome-specific subsets of feature contribution data corresponding to the looked-up tree-specific outcomes into an aggregated set of feature contribution data that indicates respective contributions of the GBM model's set of features to the given prediction output by the GBM model during execution, (iv) based on the aggregated set of feature contribution data, identifying one or more features that influenced the given prediction output by the executed GBM model, and (v) identifying one or more reason codes that correspond to the identified one or more features, wherein the identified one or more reason codes indicate the one or more reasons for the decision; and output an indication of (i) the decision of whether to extend the financial service to the given individual and (ii) the one or more reasons for the decision.

19. The method of claim 1, wherein the decision of whether to extend the financial service to the given individual comprises one of (i) a decision of whether to approve or deny the given individual's request for a new line of credit, (ii) a decision of whether to approve or deny the given individual's request for an increased credit limit on an existing line of credit, or (iii) a decision of whether to approve or deny a financial transaction initiated by the given individual.

20. The computing system of claim 6, wherein the decision of whether to extend the financial service to the given individual comprises one of (i) a decision of whether to approve or deny the given individual's request for a new line of credit, (ii) a decision of whether to approve or deny the given individual's request for an increased credit limit on an existing line of credit, or (iii) a decision of whether to approve or deny a financial transaction initiated by the given individual.

\* \* \* \* \*